United States Patent

Gerber et al.

[11] Patent Number: 6,132,135
[45] Date of Patent: *Oct. 17, 2000

[54] STRAIN RELIEF MAIN SHAFT ASSEMBLY

[75] Inventors: David W. Gerber, Massillon; Robert R. Piepho, Wadsworth, both of Ohio

[73] Assignee: McDermott Technology, Inc., New Orleans, La.

[ * ] Notice: Under 35 U.S.C. 154(b), the term of this patent shall be extended for 712 days.

[21] Appl. No.: 08/742,327

[22] Filed: Nov. 1, 1996

Related U.S. Application Data

[63] Continuation of application No. 08/389,465, Feb. 16, 1995, abandoned.

[51] Int. Cl.[7] ............................................. F16C 3/00
[52] U.S. Cl. ................................... 404/179; 464/902
[58] Field of Search ...................... 148/212, 317, 148/318; 464/179, 902, 182

[56] References Cited

U.S. PATENT DOCUMENTS

| | | | |
|---|---|---|---|
| 1,908,887 | 5/1933 | Breeler et al. | 148/317 X |
| 2,599,575 | 6/1952 | Morgan | 464/179 |
| 2,843,374 | 7/1958 | Boegehold | 464/902 |
| 3,344,817 | 10/1967 | Connard | 148/318 X |
| 3,829,260 | 8/1974 | Shimoda | 148/212 X |
| 4,948,556 | 8/1990 | Kimagai | 148/318 X |
| 4,966,751 | 10/1990 | Kaede et al. | 148/318 X |
| 5,085,713 | 2/1992 | Morishita et al. | 148/319 X |
| 5,215,823 | 6/1993 | Itoh et al. | 148/318 X |
| 5,352,303 | 10/1994 | Murakami | 148/318 X |
| 5,417,776 | 5/1995 | Yoshino et al. | 148/318 |

FOREIGN PATENT DOCUMENTS

| | | | |
|---|---|---|---|
| 40-5059530 | 3/1993 | Japan | 148/212 |

OTHER PUBLICATIONS

"Failures in E– and El–Type Pulverizer Mill Main Drive Shafts" G. Wood, and J. Hare, Power–Gen Conf., Orlando, FlA. Dec. 7–9, 1994.

*Primary Examiner*—Terry Lee Melius
*Assistant Examiner*—Greg Binda
*Attorney, Agent, or Firm*—Robert J. Edwards; Daniel S. Kalka; Eric Marich

[57] ABSTRACT

An improved main shaft for a coal pulverizer having a selected portion of the main shaft nitride treated and a dry film lubricant applied to the yoke end.

7 Claims, 3 Drawing Sheets

STRAIN RELIEF MAIN SHAFT ASSEMBLY

This is a continuation of application Ser. No. 08/389,465 filed Feb. 16, 1995, now abandoned.

BACKGROUND OF THE INVENTION

1. Field of the Invention

The present invention relates in general to an improved strain relief main shaft assembly for a coal pulverizer, and more particularly to an improved strain relief main shaft and method for making the same for use in B&W Type E and EL pulverizers

2. Description of the Related Art

FIG. 1 shows a cross section of a B&W type EL pulverizer generally depicted as numeral 2. These devices are used to crush coal for burning in a furnace or boiler. This type of pulverizer has a stationary top ring 4, one rotating bottom ring 6, and one set of balls 8 that comprise the grinding elements. The pressure required for efficient grinding is obtained from externally adjustable dual purpose springs 10. The bottom ring 6 is driven by the yoke 12 which is attached to a vertical main shaft assembly 14 of the pulverizer. The top ring 4 is held stationary by the dual purpose springs 10. Raw coal is fed into the grinding zone where it mixes with partially ground coal that forms a circulating load. Pulverizer air causes the coal to circulate through the grinding elements where some of it is pulverized in each pass through the roll of balls 8. As the coal becomes fine enough to be picked up by the air it is carried to the classifier where coal of a desired fines is separated from the stream entering the classifier and is carried out with the air. Oversized material is returned to the grinding zone.

The pulverizer is driven by spiral bevel gears 16 located in the base. Both the vertical main shaft 14 and the horizontal pinion shaft 16 are mounted in roller bearings. Forced lubrication is provided for the entire gear drive by an oil pump submerged in the oil reservoir and gear-driven from the pinion shaft.

Currently, there is some concern as to main shaft 14 failure. It is believed that the failures occur because of bending fatigue originating at fretted surfaces in the lower contract land with the yoke bushing bore. Fretting damage sometimes referred to as fretting corrosion is a condition of surface deterioration brought on by very small relative movements between bodies in contact. Also of concern is fatigue failure. Like fretting, fatigue has a definite set of characteristics which combine to identify this failure phenomenon. Pulverizer vibration usually results in high shaft stress levels and may have a role in main shaft failures. Vibration may be caused by abnormal grinding element wear such as out-of-round wear of balls or rings. Pulverizer vibration also will occur if proper air/fuel regulation is not provided.

Because of the foregoing, there have been many attempts to correct main shaft failure frequency such as employing an anti-seize compound at the taper joint, using a bushing with a undercut center portion, using full contact bushings with no undercut center portion, shot peening, and nitriding as a surface hardening process. Remedial efforts notwithstanding, even carefully fitted taper joints, when subjected to cyclic bending forces often exhibit vulnerability to fatigue failure of shafts because of fretting and strain produced within the assembly.

Thus, there is a need for an improved main shaft assembly for these types of pulverizers and a method for making one that will provide improved fretting resistance to reduce shaft failure due to fretting induced bending fatigue on ball-race coal pulverizers.

SUMMARY OF THE INVENTION

The present invention is directed to solving the aforementioned problems with the prior art as well as others by providing an improved main shaft assembly that provides improved fretting resistance. The present invention comprises a method and an improved main shaft assembly which includes nitriding the yoke end of the shaft, and using a dry lubricant treatment applied to the tapered yoke end of the main shaft and yoke bushing bore area. The interposition of a lubricant film between the cooperating surfaces will prevent or retard the onset of fretting. For long useful life, the interposed lubricant must be very durable and able to sustain mechanical loading without being forced out of the assembly. Fluid lubricant cannot sustain such loading.

An aspect of the present invention is to provide an improved main shaft assembly for a coal pulverizer which is less susceptible to failure.

Another aspect of the present invention is to provide an improved main shaft assembly that is simple in design, rugged in construction, and economical to manufacture.

Still another aspect of the present invention is a method for making an improved main shaft assembly for a coal pulverizer.

The various features of novelty which characterize the invention are pointed out with particularity in the claims annexed to and forming a part of this disclosure. For a better understanding of the invention, its operating advantages and specific aspects attained by its uses, reference is made to the accompanying drawings and descriptive matter in which the preferred embodiment of the invention is illustrated.

DESCRIPTION OF THE PREFERRED EMBODIMENT

Figure 1:
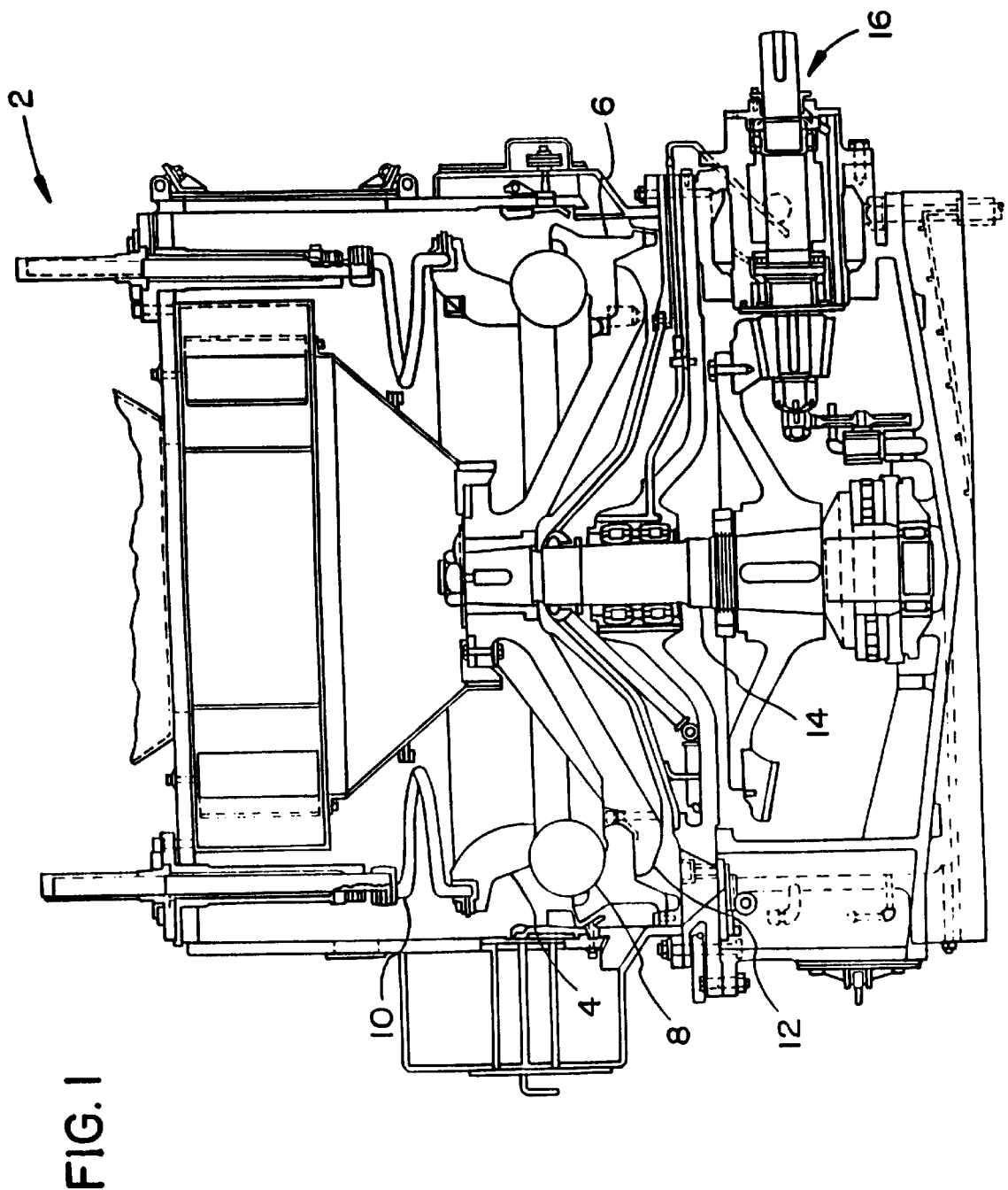
FIG. 1 is a sectional view of a B&W type EL ball and race pulverizer.
Figure 2:
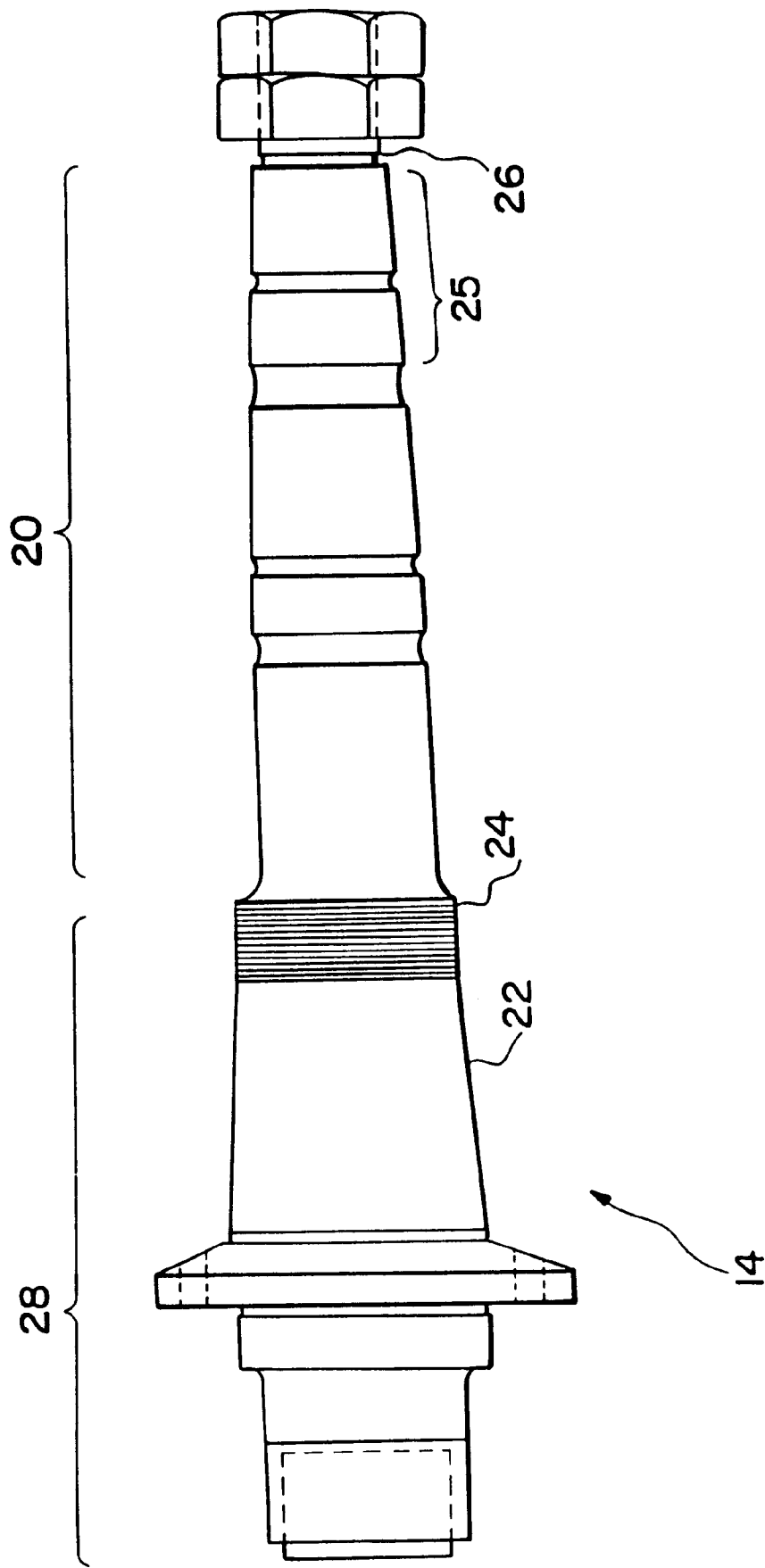
FIG. 2 is an external view of a main shaft employed in such a pulverizer.
Figure 4:
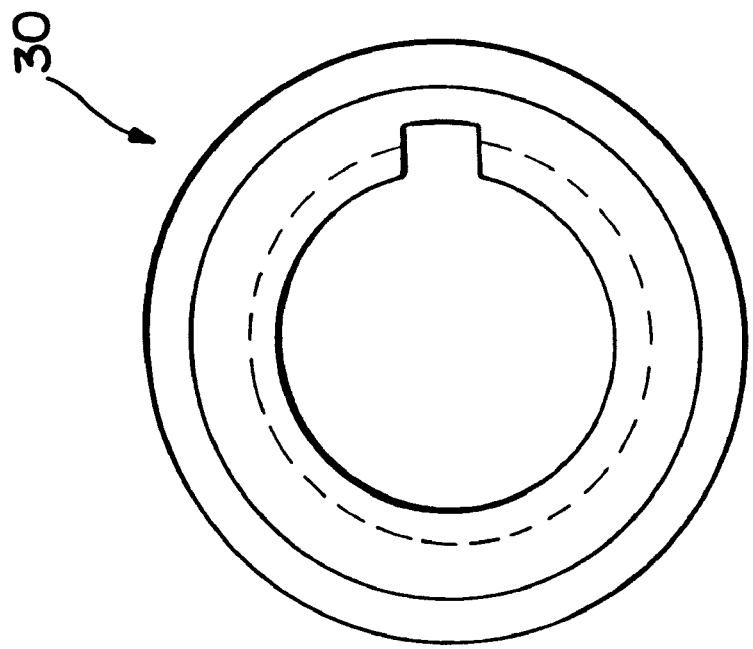
FIG. 4 is a top end view of the yoke bushing in FIG. 3.
Figure 3:
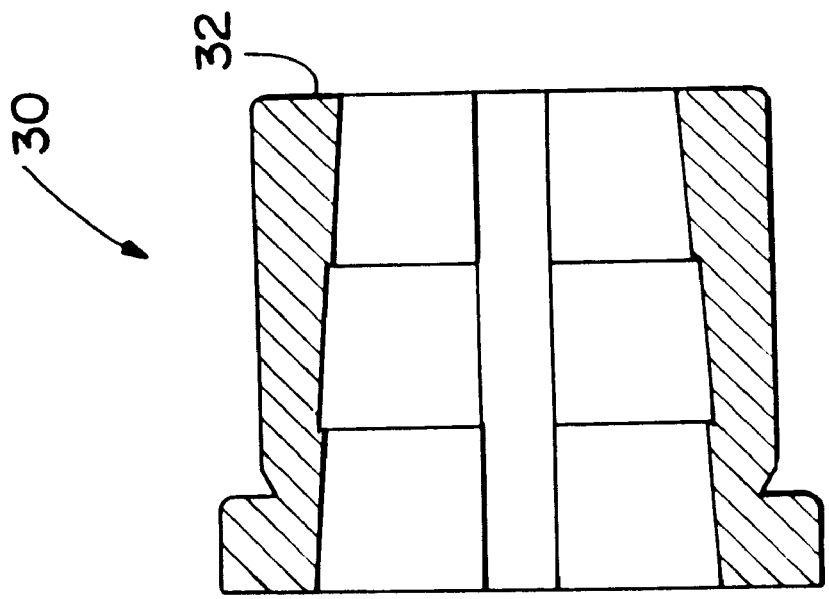
FIG. 3 is a sectional view of a yoke bushing optionally employed with the improved main shaft assembly according to the present invention.

The present invention resides in an improved main shaft and yoke assembly for a coal pulverizer and a method for making the same to reduce shaft failure due to fretting induced bending fatigue.

A suitable material for a coal pulverizer shaft is, for example as presently used, AISI 4340 steel, quenched and tempered, followed by a subcritical quench to improve surface-layer properties. The material is vacuum degassed for cleanliness, minimizing inclusions which can serve as initiation sites for fatigue cracks.

The yoke end (20) of the shaft (22) is nitride treated with the area to be treated including the portion of the shaft (22) starting at the gear center hold down threads (24) to and including upper taper (25) of the shaft. Shaft 22 includes a threaded portion 26. All internal and external threads (24) and non-treated areas of the shaft (28) are to be masked to protect them from the nitriding process. The treated areas of the shaft (20) are to be nitrided to a minimum depth of about 0.015" and a minimum surface hardness of about 45HRC.

The nitriding process is a treatment well known in this art. Advantageously, the present) invention applies this treatment to a selected portion (20) of the shaft (14) to increase surface hardness, to induce residual surface-layer compressive stress, and to improve corrosion stability and friction characteristics.

To provide the greatest degree of conformance between contacting surfaces, a common final assembly procedure is to trial fit, using marking compound, and scrape away high spots until an acceptable area of contact is achieved. This process is laborious and time consuming and would necessarily lead to the removal of some or all of any applied surface film. Therefore, following nitriding of the mainshaft, the bushing is fitted and adjusted to the main shaft taper at which time the mating parts are permanently marked as a matched set. Following fitting, the mainshaft and the bushing are submitted to application of the dry, durable lubricant film on their respective contacting surfaces.

There is a general practice for friction-fit joints to maintain a specific difference in hardness between the male and female elements. A difference of 50 points of Brinnell hardness (BHN) value or five Rockwell ($R_c$) points is said to be desirable to prevent galling. This is an important consideration in self-holding tapers such as machine-tool bit shanks or in cylindrical joints subject to disassembly.

This hardness difference may not be required for EL shaft and bushing combinations, but prudent practice has nonetheless adopted the 50point difference. The application of a durable lubricating film eliminates the need for continuing this practice and yoke bushings as soft as 220BHN are acceptable. The bushing (30) is tempered to a selected hardness. The bushing (30) is positioned on the yoke end (20) of the shaft (22) with a dry film lubricant placed inside the bushing (30). The bushing (30) has a hardness ranging from about 220 to 300 Brinnell hardness.

A dry film lubricant such as tungsten disulfide ($WS_2$) is applied to the tapered yoke end (25) of the main shaft (14) and yoke bushing undercut bore area (32). The tungsten MICROLON 1052 REGISTERED TRADEMARK OF MICRO SURFACE CORP. disulfide is applied in lamellar form to a surface depth of about 0.5 microns or greater. The film hardness is approximately 30 Rockwell C (HRc) and is able to withstand the forces and stresses within the assembled joint. No degradation to the existing shaft or bushing surface or dimensions will result from the application process.

Advantageously, the method of the present invention has found that nitriding of the main shaft in a selected area at the failure zone produces an increase in surface hardness and a lower friction coefficient that provides improved resistance to fretting. The nitrided surface produces a slight compressive stress that reduces the magnitude of the in service bending tensile stresses. The nitride surface will provide some measure of corrosion resistance to the area of the shaft/yoke bushing.

Advantageously, the use of a softer yoke bushing may improve the toughness of the component. Finally, the tungsten disulfide coating provides strain relief properties of the assembly by reducing friction forces and surface strain from relative movement.

While a specific embodiment of the invention has been shown and described in detail to illustrate the application of the principles of the invention, it will be understood that the invention may be embodied otherwise without departing from such principles.

We claim:

1. In a coal pulverizer having a main shaft, the main shaft including a yoke end at one end of the main shaft with the yoke end including a tapered yoke end at a distal end thereof, the tapered yoke end of the main shaft terminating with a threaded portion, the main shaft further including gear center hold down threads dividing the yoke end from the other end of the main shaft, wherein the improvement comprises the main shaft having a portion of the main shaft being nitride treated, said portion of the main shaft beginning at but not including the gear center hold down threads to and including the yoke end and the tapered yoke end of the main shaft, and the tapered yoke end having a dry film lubricant applied thereon.

2. The improved main shaft as recited in claim 1, wherein said dry film lubricant is tungsten disulfide.

3. The improved main shaft as recited in claim 2, wherein the tungsten disulfide is applied in lamellar form to a surface depth of about 0.5 microns or greater.

4. The improved main shaft as recited in claim 1, further comprising a bushing tempered to a selected hardness, said bushing having a dry film lubricant therein and being positioned on the tapered yoke end of the main shaft.

5. The improved main shaft as recited in claim 4, wherein said bushing has a hardness ranging from about 220 to 300 Brinnell hardness.

6. The improved main shaft as recited in claim 1, wherein the shaft is nitride treated to a minimum depth of about 0.015 inches.

7. The improved main shaft as recited in claim 1, wherein the nitride treated shaft has a minimum hardness of about 45 HRC.

* * * * *